(12) United States Patent
Ke et al.

(10) Patent No.: US 11,884,250 B2
(45) Date of Patent: Jan. 30, 2024

(54) BRAKE COOLING ASSEMBLY

(71) Applicant: Honeywell International Inc., Charlotte, NC (US)

(72) Inventors: Xing Ke, Shanghai (CN); Jinhua Yi, Suzhou (CN); Cheng Chao Luo, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 59 days.

(21) Appl. No.: 16/949,480

(22) Filed: Oct. 30, 2020

(65) Prior Publication Data
US 2022/0135008 A1  May 5, 2022

(51) Int. Cl.
*B60T 5/00* (2006.01)
*F16D 65/78* (2006.01)
*B64C 25/42* (2006.01)

(52) U.S. Cl.
CPC .............. *B60T 5/00* (2013.01); *B64C 25/42* (2013.01); *F16D 65/78* (2013.01); *F16D 2065/787* (2013.01)

(58) Field of Classification Search
CPC .................................................. F16D 2065/787
See application file for complete search history.

(56) References Cited

U.S. PATENT DOCUMENTS

| | | | | |
|---|---|---|---|---|
| 2,925,723 A | * | 2/1960 | Hagen | F25D 17/067 62/402 |
| 2,940,549 A | * | 6/1960 | Hause | F16D 65/853 188/71.6 |
| 3,033,319 A | * | 5/1962 | Wrigley | F16D 65/853 188/152 |
| 3,033,329 A | * | 5/1962 | Malloy | F16D 55/40 188/71.6 |
| 3,251,437 A | * | 5/1966 | Moyer | F16D 55/40 188/264 AA |
| 3,983,974 A | | 10/1976 | Dowell et al. | |
| 9,573,567 B2 | | 2/2017 | Kirkbride et al. | |

(Continued)

FOREIGN PATENT DOCUMENTS

| | | |
|---|---|---|
| CN | 206609089 U | * 11/2017 |
| EP | 2772428 A1 | 9/2014 |

(Continued)

OTHER PUBLICATIONS

"Brake Cooling," Safran Ventilation Systems, accessed from https://www.safran-ventilation-systems.com/aircraft/brake-cooling, Jun. 4, 2015, 1 pp.

(Continued)

*Primary Examiner* — Melody M Burch
(74) *Attorney, Agent, or Firm* — Shumaker & Sieffert, P.A.

(57) ABSTRACT

In some examples, a cooling system includes a brake assembly defining a plurality of cooling channels. The brake assembly is configured to be positioned within a wheel cavity of a wheel. The cooling system includes a distributor configured to receive a flow of cooling fluid and supply the cooling fluid to the plurality of cooling channels. One or more cooling channels are configured to receive the cooling fluid and discharge the cooling fluid into the wheel cavity of the wheel. The cooling system may include a fan configured to provide the cooling fluid to the distributor.

20 Claims, 8 Drawing Sheets

(56) References Cited

U.S. PATENT DOCUMENTS

| | | | |
|---|---|---|---|
| 10,203,010 | B2 | 2/2019 | Gonzalez et al. |
| 10,597,148 | B2 | 3/2020 | Meinel |
| 10,598,209 | B2 | 3/2020 | Whittle et al. |
| 2019/0112037 | A1 | 4/2019 | Meinel Cheesman |
| 2019/0301554 | A1 | 10/2019 | Hosamane et al. |
| 2021/0231184 | A1 | 7/2021 | Ganesh et al. |

FOREIGN PATENT DOCUMENTS

| | | | | |
|---|---|---|---|---|
| JP | 2001500590 A | * | 1/2001 | |
| RU | 2222473 C1 | * | 1/2004 | |
| WO | WO-0120187 A1 | * | 3/2001 | ............ B64C 25/36 |
| WO | 2020/074805 A1 | | 4/2020 | |

OTHER PUBLICATIONS

"Aircraft Brake Fan," SUPERVAC, Speciality Fans, accessed from https://supervac.com/specialty-fans/aircraft-brake-fan/, accessed on Oct. 9, 2020, 10 pp.

Extended Search Report from counterpart European Application No. 21205272.4, dated Apr. 12, 2022, 8 pp.

Response to Extended Search Report dated Apr. 12, 2022, from counterpart European Application No. 21205272.4 filed May 16, 2022, 43 pp.

Notice of Intent to Grant and Text Intended to Grant from counterpart European Application No. 21205272.4 dated Nov. 24, 2023, 87 pp.

* cited by examiner

BRAKE COOLING ASSEMBLY

TECHNICAL FIELD

The present disclosure relates to brake systems of a vehicle.

BACKGROUND

Vehicles, such as aircrafts, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake assembly may be configured to compress the rotor discs and the stator discs between the piston and a backing plate supported by the torque tube.

SUMMARY

The present disclosure describes articles, systems, and techniques relating to cooling to one or more components of a brake assembly. In examples described herein, a cooling system is configured to provide a flow of cooling fluid from a fan to a distributor mounted or otherwise engaged with the brake assembly. When the brake assembly is positioned within a wheel cavity of a wheel, the distributor is configured to provide the cooling fluid to a plurality of cooling channels configured to discharge the cooling fluid into the wheel cavity. The cooling channels are configured to discharge the cooling fluid to cause a heat transfer from the brake assembly (e.g., a disc stack of the brake assembly) to the cooling fluid. In some examples, the fan may be attached to a strut supporting the wheel and configured to be actuated by an operator within a vehicle (e.g., a pilot within an aircraft). Hence, the cooling system may be configured to allow a pilot or other operator to initiate cooling of a brake assembly without the necessity for set up and subsequent operation of a separate cooling system by ground crew personnel.

In an example, a system comprises: a brake assembly configured to be positioned within a wheel cavity of a wheel, wherein the brake assembly defines a plurality of cooling channels; and a distributor configured to receive a flow of cooling fluid and supply the cooling fluid to the plurality of cooling channels, wherein at least one cooling channel of the plurality of cooling channels is configured to receive a portion of the cooling fluid from the distributor and discharge the portion of the cooling fluid into the wheel cavity when the brake assembly is positioned within the wheel cavity.

In an example, a system comprises: a brake assembly configured to be positioned within a wheel cavity of a wheel, wherein the brake assembly defines a plurality of cooling channels; a fan configured to provide a flow of cooling fluid; and a distributor including one or more distributor inlets and a plurality of distributor outlets, wherein the distributor is configured to receive the flow of cooling fluid from the fan through the one or more distributor inlets and supply the flow of cooling fluid to the plurality of cooling channels through the plurality of distributor outlets, wherein each cooling channel is configured to establish a fluid connection with at least one of the distributor outlets, and wherein at least one cooling channel is configured to discharge a portion of the cooling fluid into the wheel cavity.

An example technique for cooling a brake assembly using the cooling system is additionally described herein.

The details of one or more examples are set forth in the accompanying drawings and the description below. Other features, objects, and advantages will be apparent from the description and drawings, and from the claims.

DETAILED DESCRIPTION

Figure 1:
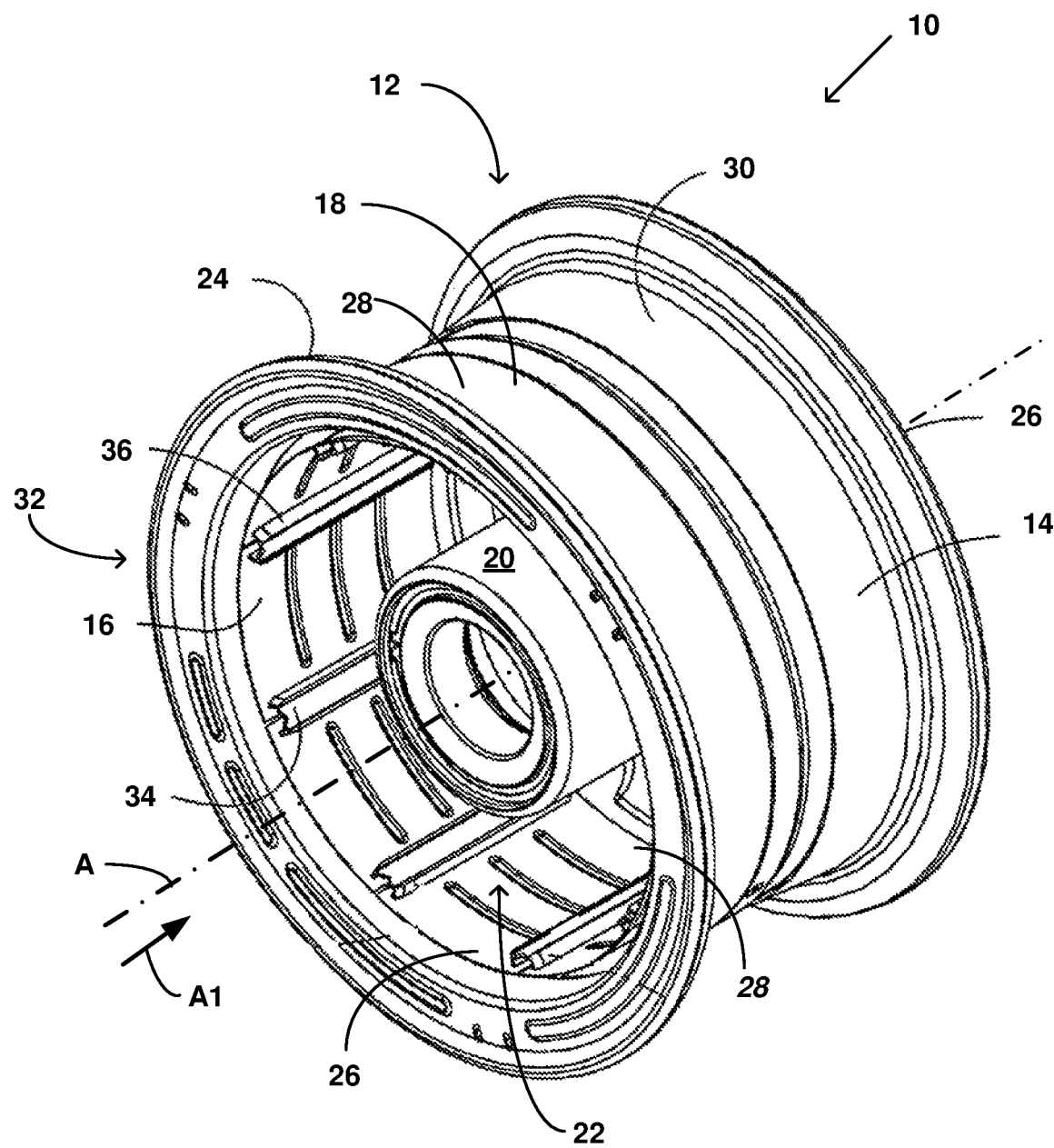
FIG. 1 is a perspective view illustrating an example wheel including a wheel cavity.

The disclosure describes articles, systems, and techniques relating to cooling an assembly comprising a wheel and a brake assembly. The wheel is configured to rotate around a wheel axis. The brake assembly includes a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

Engaging the friction surfaces of the rotating rotor discs and stationary stator discs may cause an increase in temperature of the rotor discs, the stator discs, or other components of the brake assembly. In some cases (e.g., following an aircraft landing), it may be desirable to supply a cooling fluid to the disc stack or other portions of the brake assembly to reduce the temperature more quickly. Some wheel and brake assemblies require a separate cooling system (e.g., a system separate from an aircraft) to be set up and operated by a ground crew, in order to generally direct a flow of a cooling fluid over the brake assembly. The necessity for set up and subsequent operation of the separate cooling system by ground crew personnel may contribute to tarmac delays, negatively impacting the ability of an aircraft to accomplish a desired flight schedule and negatively impacting the efficiency of airport operations.

In examples described herein, a cooling system for a brake assembly of a vehicle includes a fan configured to supply a cooling fluid (e.g., air) and a distributor configured to distribute the cooling fluid to one or more cooling channels within the brake assembly, in order to reduce the temperature. While the cooling system is described with reference to an aircraft, in other examples, the cooling system can be used with other vehicles. The cooling system is integrated with the aircraft (or other vehicle) and is not separately attached to the vehicle by a ground crew after a landing operation or other operation of an aircraft resulting in relatively high brake assembly temperatures. For example, in some examples, the fan and the distributor are configured to remain fluidly connected to the cooling channels as the brake assembly is translated (e.g., during the raising or lowering of the landing gear of an aircraft), such that the cooling system requires minimal or no set-up to provide cooling to the brake assembly when desired (e.g., following an aircraft landing). In some examples, the cooling system is configured to allow an operator within a vehicle (e.g., a pilot within an aircraft) to actuate the fan to initiate and/or substantially cease the flow of cooling fluid. Hence, the cooling system may be configured to allow an operator and/or an onboard control system to initiate cooling of the brake assembly in a manner minimizing or eliminating the need for a ground crew to set-up and operate a separate cooling system.

The brake assembly defines the plurality of cooling channels into which a cooling fluid (e.g., air) may be introduced to reduce the temperature of the brake assembly (e.g., the temperature of individual components and/or the temperature in a volume in which the brake assembly is positioned). These cooling channels may be considered to be part of the cooling system. A cooling channel is configured to receive the cooling fluid at a channel inlet and discharge at least some portion of the cooling fluid received into a wheel cavity of the wheel through one or more channel outlets. The cooling channel may be configured to substantially direct the discharge toward the brake disc stack, to facilitate cooling of the rotor discs and the stator discs. In some examples, the cooling channel is configured to distribute the discharge of cooling fluid over a displacement substantially parallel (e.g., parallel or within, for example, about 10 degrees) to an axial direction of the wheel in order to, for example, distribute the cooling fluid substantially throughout the wheel cavity. This distribution of cooling may, for example, provide relatively efficient cooling of the brake assembly. In addition or instead of the direction substantially parallel to the axial direction of the wheel, in some examples, the cooling channel is configured to discharge a portion of the cooling fluid to cause the portion of the cooling fluid to flow in a direction radially outward from an axis of the wheel.

The one or more of the cooling channels are defined by one or more structures of the brake assembly that may otherwise be present without the cooling system. For example, the one or more cooling channels may be defined by a cavity extending within a structure of the brake assembly (e.g., a spline, a torque tube, or some other component of the brake assembly). As another example, the one or more cooling channels may be defined by a space between a first component (e.g., a spline or other component) connected and/or attached to a second component (e.g., a torque tube or other component) of the brake assembly. Defining the cooling channels using one or more suitable structures of the brake assembly may reduce a weight load associated with the cooling system. For example, defining the cooling channels using one or more suitable structures of the brake assembly may reduce the impact of the cooling system weight on a wheel and/or landing gear of an aircraft.

In some examples, one or more of the cooling channels is defined by a spline configured to allow translation of one or more stator discs (e.g., an axial direction of the wheel) when the disc stack is compressed. The spline can be, for example, attached to a torque tube of the brake assembly. The spline may be configured to define the cooling channel within a cavity of the spline, including the channel inlet configured to receive the cooling flow from a cooling fluid source and the one or more channel outlets configured to direct the portion of the cooling flow into the wheel cavity. In some examples, a brake assembly includes plurality of splines each defining at least one respective cooling channel, with each cooling channel configured to receive a flow of cooling fluid from a cooling fluid source and direct some portion of the cooling fluid into the wheel cavity.

The cooling system includes a distributor configured to receive a flow of the cooling fluid from a cooling fluid source and direct the cooling fluid into one or more channel inlets. For example, the distributor may be configured to receive the flow of cooling fluid from a fan and direct the cooling fluid on the one or more channel inlets of the cooling channels. In some examples, the distributor includes one or more distributor inlets configured to establish a fluid connection with an exhaust of the fan, such that the fan exhaust directly injects the cooling fluid into the distributor. For example, a distributor inlet may be configured to establish a fluid connection with a conduit (e.g., a hose) configured to establish a fluid connection with the fan exhaust. The distributor may include one or more distributor outlets configured to establish a fluid connection with at least one of the cooling channels (e.g., with a cooling inlet of the cooling channel), such that the distributor defines a confined flow path for the flow of cooling fluid from the fan exhaust to the cooling channel.

The distributor may be configured to remain substantially stationary with respect to an axis of the wheel and/or some portion of the brake assembly. For example, the distributor may be configured such that a translation of the wheel axis and/or one or more portions of the brake assembly causes a translation of the distributor. In some examples, the distributor may be configured such that, when the wheel axis and/or brake assembly is caused to translate during the raising or lowering of the landing gear of an aircraft, the distributor remains substantially stationary with respect to the wheel axis and/or brake assembly. The distributor may be configured to substantially maintain the fluid connection between distributor outlets and the cooling channel inlets during the translation of the distributor and the wheel axis and/or brake assembly. In some examples, the distributor may be a separate component configured to attach to the brake assembly. In other examples, the brake assembly may define part or all of the distributor, such that the distributor in an integrated portion of one of more portions of the brake assembly.

In some examples, the source of the cooling fluid is configured to attach to a strut supporting the wheel. The source of the cooling fluid can have any suitable structure, such as a fan, which is primarily referred to herein as an example cooling fluid source for ease of description. The fan may be configured such that during motion of the strut (e.g., during the raising or lowering of the landing gear of an aircraft), the fan remains attached to the strut. The fan may be configured to substantially maintain the fluid connection between the fan exhaust and the one or more distributor inlets during the motion of the strut. For example, fan exhaust may be configured to fluidly connect with one or more conduits (e.g., hoses) configured to maintain the fluid connection between the fan and the distributor during the motion of the strut. The fan may be, for example, a centrifugal turbofan configured to supply the flow of cooling fluid (e.g., air) to the distributor via a fan exhaust defined by a fan housing.

In examples, the cooling system includes control circuitry configured to actuate the fan. The control circuitry may be configured to cause the fan to generate the flow of cooling fluid to the distributor, and may be configured to cause the fan to substantially cease generating the flow of air to the distributor. The control circuitry may be configured to receive one or more inputs to cause the fan to generate the flow and/or cause the fan to cease generating the flow. For example, the control circuitry may be configured to receive the one or more inputs from a location within an aircraft, such as a cockpit. The control circuitry may be configured to allow a pilot or other operator within the cockpit to actuate the fan to begin supplying the cooling fluid to the brake assembly, and configured to allow the pilot to secure the fan to substantially cease the supply of the cooling fluid. Hence, the cooling system may be configured to allow a pilot to initiate a cooling flow to a brake assembly following an aircraft stop in a manner minimizing the need for support actions by a ground crew.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around the axis of rotation A. An axial direction A1 of wheel 10 is parallel to the axis of rotation A and has a direction from inboard section 28 toward outboard section 30. In examples, the axial direction A1 is an outboard direction of wheel 10 and a direction opposite axial direction A1 is an inboard direction of wheel 10.

Wheel 10 includes a plurality of rotor drive keys 32 on interior surface 16 of wheel 10, such as rotor drive key 34 and rotor drive key 36. In some examples, each rotor drive key of the plurality of rotor drive keys 32 extends in a substantially axial direction of wheel 10 (e.g., in a direction parallel to the axis of rotation A). The plurality of rotor drive keys 32 ("rotor drive keys 32") and interior surface 16 are configured to be substantially stationary with respect to each other, such that when wheel 10 (and interior surface 16) rotates around axis of rotation A, each of the rotor drive keys (e.g., rotor drive keys 34, 36) translates over a closed path around axis A. Consequently, when wheel 10, interior surface 16, and rotor drive keys 32 are rotating around axis of rotation A, a force on one or more of rotor drive keys 32 opposing the direction of rotation acts to slow or cease the rotation. As will be discussed, rotor drive keys 32 may be configured to receive a torque from a braking system (not shown) configured to reduce and/or cease a rotation of wheel 10. Rotor drive keys 32 may be integrally formed with interior surface 16, or may be separate from and mechanically affixed to interior surface 16.

Figure 2:
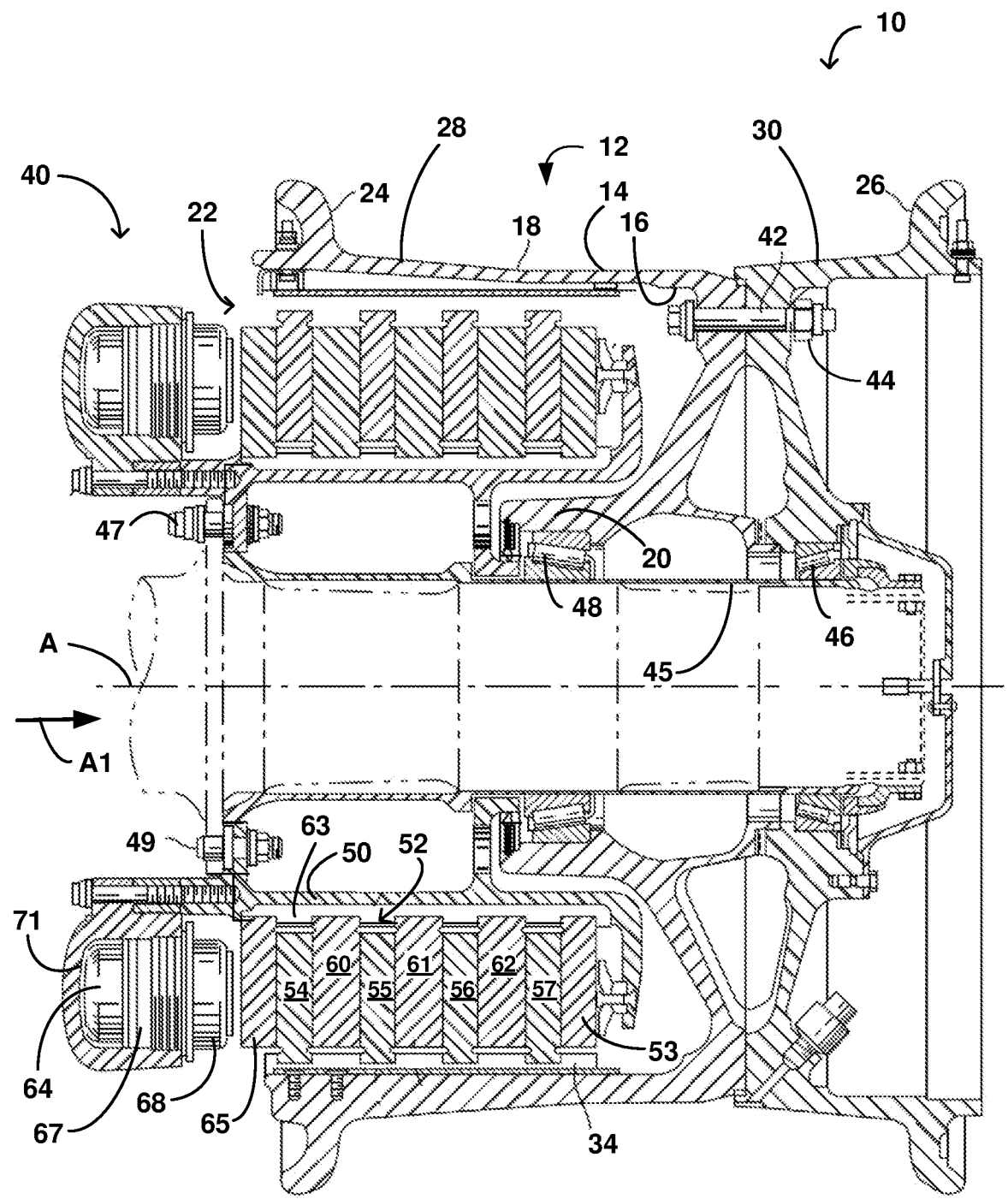
FIG. 2 is a schematic cross-sectional view illustrating an example wheel and brake assembly including the wheel of FIG. 1.

FIG. 2 is a schematic cross-sectional view illustrating wheel 10 and an example brake assembly 40. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples.

Wheel 10 is configured to rotate about axis A extending through axial assembly 45. Axial assembly 45 is figured to support wheel 10 while allowing wheel 10 to rotate around axis A using bearing 46 and bearing 48. For example, bearings 46, 48 may define a substantially circular track around axial assembly 45. A torque tube 50 is coupled to axial assembly 45, such that torque tube 50 remains substantially rotationally stationary when wheel 10 rotates around axial assembly 45 and axis A. Torque tube 50 may at least partially surround an exterior of axial assembly 45. Axial assembly 45 may be mechanically coupled to a strut 11 (FIG. 3) attached to a vehicle (e.g., a landing gear strut).

In the example shown in FIG. 2, brake assembly 40 is positioned within wheel 10 and is configured to engage main torque tube 50 and rotor drive key 34. Brake assembly 40 is configured to generate a torque to oppose a rotation of wheel 10 around axis A and transfer the torque to rotor drive key 34, reducing and/or eliminating the rotation of wheel 10 around axis A. Brake assembly 40 includes a disc stack 52 which includes one or more rotor discs (e.g., rotor discs 54, 55, 56, 57) and one or more stator discs (e.g., stator discs 60, 61, 62). Rotor discs 54, 55, 56, 57, and/or stator discs 60, 61, 62 may have any suitable configuration. For example, rotor discs 54, 55, 56, 57 and/or stator discs 60, 61, 62 can each be substantially annular discs surrounding axial assembly 45. Stator discs 60, 61, 62 are coupled to torque tube 50 via spline 63 and remain rotationally stationary with torque tube 50 (and axial assembly 45) as wheel 10 rotates. Rotor discs 54, 55, 56, 57 are rotationally coupled to rotor drive key 34 and interior surface 16 and rotate substantially synchronously with wheel 10 around axis A.

An actuator 64 is configured to compress disc stack 52 to bring friction surfaces of rotor discs 54, 55, 56, 57 into contact with friction surfaces of stator discs 60, 61, 62 generating shearing forces between the discs. The shearing forces cause rotor discs 54, 55, 56, 57 to exert a torque on rotor drive key 34 opposing a rotation of wheel 10. In some examples, actuator 64 is configured to compress disc stack 52 using a pressure plate 65. Actuator 64 is configured to cause a piston 68 to translate relative to a body 67 of actuator 64 to compress disc stack 52. Actuator 64 may cause piston 68 to translate using any suitable method. In some examples, actuator 64 is configured to cause translation of piston 68 by supplying and/or venting a pressurized hydraulic fluid to or from a piston chamber. In addition or instead, in some examples, actuator 64 is configured to cause piston 68 to translate through a motion (e.g., a rotary motion) generated by an electric motor. In the example shown in FIG. 2, actuator 64 is configured to compress disc stack 52 against a backing plate 53.

A housing 71 is configured to partially or fully cover and/or protect one or more components of brake assembly 40, such as actuator body 67. Housing 71 may be configured to attach to torque tube 50 and/or another component of brake assembly 40 configured to remain substantially stationary with respect to torque tube 50. In some examples, housing 71 is configured to at least partially extend outside of wheel cavity 22 on a side of wheel 10 including inboard section 28 (e.g., an inboard side of wheel 10).

The shearing forces generated between rotor discs 54, 55, 56, 57 and stator discs 60, 61, 62 when actuator 64 compresses disc stack 52 act to convert kinetic energy (e.g., of an aircraft) to thermal energy. Disc stack 52 may act as a heat sink to absorb some part of the thermal energy, leading to increases in the temperature of rotor discs 54, 55, 56, 57 and/or stator discs 60, 61, 62. In examples, disc stack 52 acts as a heat sink to absorb most of the thermal energy. The increased temperatures may accelerate the oxidation, and may decrease the braking performance and lifecycle of brake assembly 40. In some cases, following an operation of brake assembly 40, cooling of brake assembly 40 (e.g., disc stack 52) may be required in order to ensure sufficient braking power is available before subsequent operation. For example, following an aircraft landing, while the aircraft is parked, forced convection cooling may be provided to a brake assembly such as brake assembly 40 in order to reduce the temperature of disc stack 52 prior to subsequent operation (e.g., during a scheduled take off and/or taxiing). In some circumstances, the requirement for brake cooling may result in tarmac delays for an aircraft when, for example, a cooling system substantially separate (e.g., having a fan or other components physically separate from the aircraft) from brake assembly 40 and wheel 10 must be set up and operated by ground crew personnel before the forced convection cooling may commence.

A cooling system described herein is configured to be attached to an aircraft and remain attached to the aircraft, such that ground crew personnel at an airport does not need to set-up a separate brake cooling system to cool brake assembly 40 after a landing operation or other aircraft ground operation resulting in heating of brake assembly 40. The cooling system includes a fan configured to generate a flow of cooling fluid and a distributor configured to deliver the cooling fluid to one or more cooling channels defined by a brake assembly. The distributor may be configured to remains substantially stationary with respect to the wheel axis and/or brake assembly and the fan may be configured to remain substantially stationary with a portion of a vehicle, such as an aircraft strut. The cooling system may be configured to substantially maintain a confined flow path (e.g., using a hose) for the cooling fluid from an exhaust section of the fan to the distributor when the distributor moves relative to the fan, such as during the raising or lowering of an aircraft landing gear. The cooling system includes control circuitry configured to control the fan. The control circuitry may be configured to allow an operator within a cockpit or remotely located from the aircraft to cause the fan to initiate and/or substantially cease the cooling flow, such that the operator may initiate and/or substantially cease brake cooling following an aircraft stop in a manner minimizing the need for support actions by a ground crew.

Wheel 10 may be used with any variety of private, commercial, or military aircraft or other type of vehicle. Wheel 10 may be mounted to a vehicle using, for example, bolts 47 and/or bolts 49, or some other fastening device. Axial assembly 45 may be mounted on a strut of a landing gear (not shown) or other suitable component of a vehicle to connect wheel 10 to the vehicle. Wheel 10 may rotate around axis A and axial assembly 45 to impart motion to the vehicle. Wheel 10 is shown and described to provide context to the brake assembly described herein, however the brake assembly described herein may be used with any suitable wheel assembly in other examples.

Figure 3:
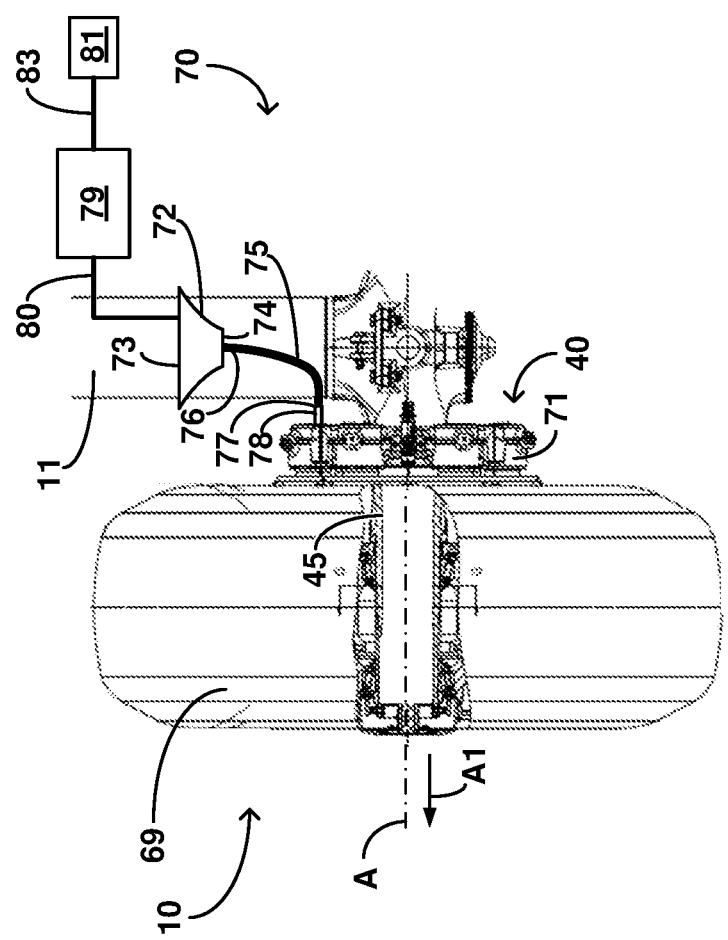
FIG. 3 is a schematic plan view illustrating an example cooling system.

FIG. 3 schematically illustrates an example cooling system 70 configured to provide brake cooling to a brake assembly 40 within wheel cavity 22 (FIGS. 1 and 2) of wheel 10. FIG. 3 illustrates an example environment in which cooling system 70 may be used and, in particular, illustrates a tire 69 is mounted on exterior surface 14 between inboard bead seat 24 and an outboard bead seat 26 (FIGS. 1 and 2) of wheel 10. A strut 11 is configured to support an axle (not shown) extending through axial assembly 45, with the axle configured to enable rotation of wheel 10 around axis A. Cooling system 70 includes a fan 72, a conduit 75, and a distributor 78. Fan 72 is configured to generate a flow of cooling fluid in a direction from a fan inlet section 73 towards a fan exhaust section 74. Fan 72 may be mounted to strut 11 and configured to remain stationary with respect to strut 11, even during aircraft operations (e.g., landing and taxiing).

Conduit 75 (e.g., a hose) includes a conduit inlet 76 and a conduit outlet 77 and defines a confined fluid flow path between conduit inlet 76 and conduit outlet 77. Conduit inlet 76 establishes a fluid connection with fan exhaust section 74, such that conduit 75 provides a confined flow path for a flow of cooling fluid discharging through fan exhaust section 74. Conduit outlet 77 establishes a fluid connection with a distributor 78. Hence, cooling system 70 is configured to define a confined flow path for a flow of cooling fluid from fan exhaust section 74 to distributor 78.

Fan 72 is configured to generate a flow of cooling fluid from fan inlet section 73 toward fan exhaust section 74. In examples, fan 72 includes a rotating assembly of blades configured to rotate around an axis of a fan axle. Fan 72 may include a housing configured to surround the blades and/or defining fan inlet section 73 and fan exhaust section 74. For example, fan 72 may be an axial fan, a centrifugal (e.g., radial) fan, a cross-flow (e.g., tangential) fan, or a combination thereof. In some examples, fan 72 is a turbofan. Fan 72 may include an impellor configured to increase a pressure of a cooling fluid flowing from fan inlet section 73 to fan exhaust section 74. The impellor may be configured to, for example, cause a compression of the cooling fluid (e.g., against the fan housing) in order to generate the flow from fan inlet section 73 to fan exhaust section 74. The impellor may be configured to generate one or more compression stages. In examples, the impellor may be configured to cause a flow acceleration of the cooling fluid (e.g., in a direction substantially parallel to the fan axis) in order to generate the flow from fan inlet section 73 to fan exhaust section 74.

Distributor 78 is configured to deliver the flow of cooling fluid generated by fan 72 to a plurality of cooling channels defined by brake assembly 40. The plurality of cooling channels are configured to distribute the cooling fluid within wheel cavity 22 (FIGS. 1 and 2) to provide cooling to one or more components of brake assembly 40 (e.g., disc stack 52). In some examples, the plurality of cooling channels may be configured to distribute the flow of cooling fluid over a displacement substantially parallel to axis A of wheel 10. In addition or instead, in examples, the plurality of cooling channels are configured to discharge the flow of cooling fluid in a direction radially outward from axis A.

In the example shown in FIG. 3, cooling system 70 includes control circuitry 79 configured to control fan 72. Control circuitry 79 may be configured receive an activation signal (e.g., via communication link 80) and cause fan 72 to generate the flow of cooling fluid. Control circuitry 79 may be configured receive a fan deactivation signal (e.g., via communication link 80) and cause fan 72 to cease generating the flow of cooling fluid. In some examples, the activation and/or deactivation may be initiated by an operator using a user interface 81 (e.g., a switch, button, or another input mechanism) configured to generate either the activation signal or the deactivation signal (e.g., via communication link 83). Consequently, in some examples, the operator may initiate and/or secure brake cooling to brake assembly 40 using cooling system 70. For example, when wheel 10 is mounted to an aircraft, an operator may choose to initiate brake cooling to brake assembly 40 following landing of the aircraft. Thus, cooling system 70 may reduce and/or eliminate tarmac delays caused when a cooling system substantially separate from brake assembly 40 and wheel 10 must be set up and operated by ground crew personnel.

Cooling system 70 may be configured such that fan 72, conduit 75, and distributor 78 remain fluidly connected to the plurality of cooling channels as wheel 10 and axis A are translated (e.g., during the raising or lowering of the landing gear of an aircraft), such that the cooling system requires minimal or no set-up to provide cooling to brake assembly 40 when desired (e.g., following an aircraft landing, or while the landing gear is raised, or some other time).

Figure 4:
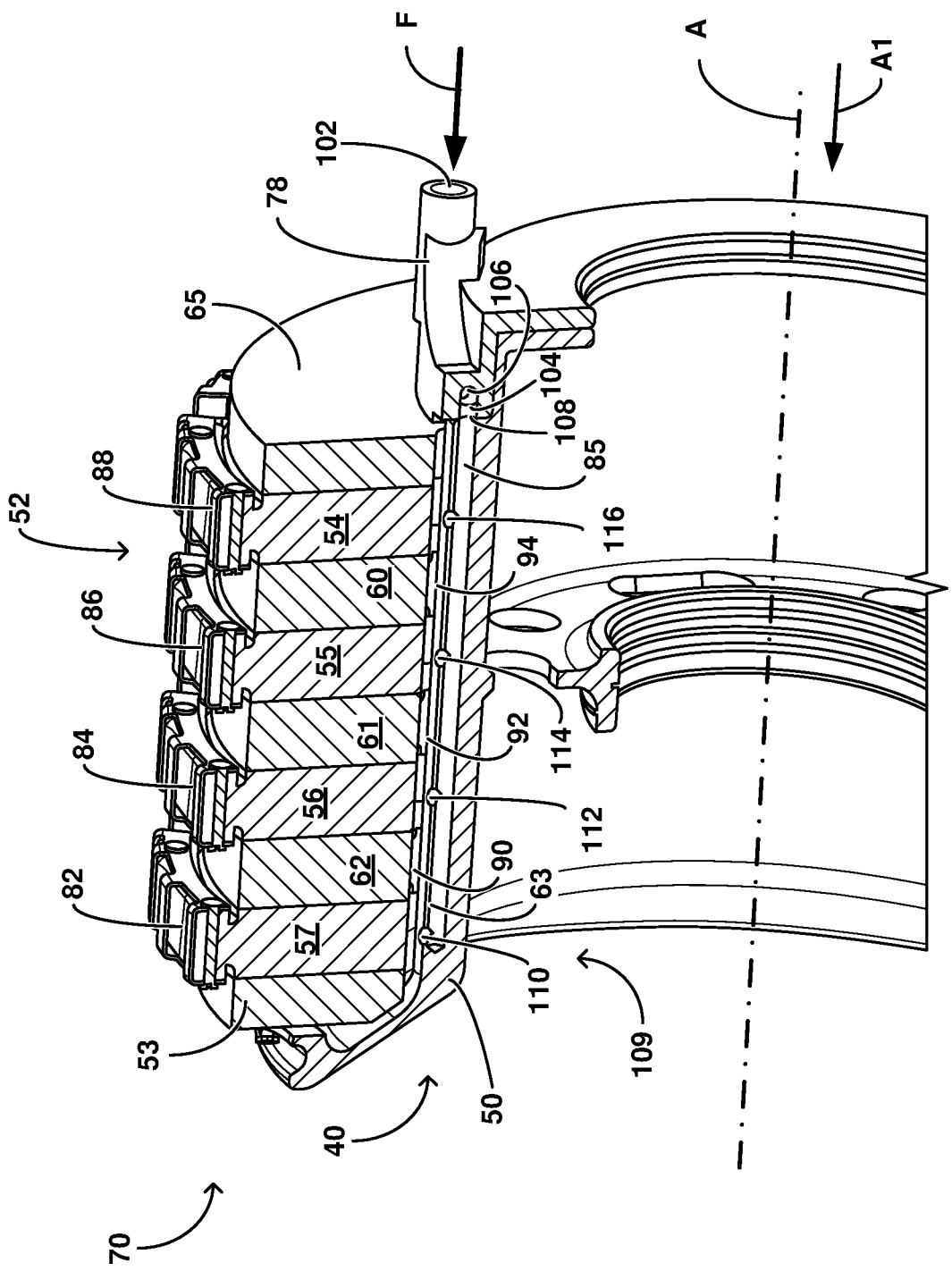
FIG. 4 is a perspective view of selected cross-sections of an example cooling system.

FIG. 4 schematically illustrates cooling system 70 configured to provide a flow of a cooling fluid (e.g., air) to a cooling channel 85 defined by brake assembly 40. Cooling system 70 may be within a wheel cavity of a wheel (e.g., wheel cavity 22 of wheel 10). FIG. 4 also illustrates a portion of brake assembly 40 including disc stack 52 and torque tube 50. Disc stack 52 is configured to be compressed (e.g., by an actuator 64 (FIG. 2)) between pressure plate 65 and backing plate 53. Torque tube 50 supports disc stack 52, pressure plate 65, and backing plate 53. Torque tube 50 is configured to remain rotationally stationary when wheel 10 rotates around axis A. In FIG. 4, disc stack 52, torque tube 50, and portions of cooling system 70 are illustrated as cross-sections with a cutting plane taken parallel to the page.

Rotor discs 54, 55, 56, 57 are configured to rotate substantially synchronously with wheel 10. In some examples, each of rotor discs 54, 55, 56, 57 include a plurality of drive slots configured engage the plurality of rotor drive keys 32 of wheel 10 to cause the rotation. Each of rotor discs 54, 55, 56, 57 may include a plurality of drive slots on an outer perimeter of the respective rotor discs 54, 55, 56, 57. For example, rotor disc 54 includes drive slot 82, rotor disc 55 includes drive slot 84, rotor disc 56 includes drive slot 86, and rotor disc 57 includes drive slot 88. Drive slots 82, 84, 86, 88 are configured to engage a rotor drive key (e.g., rotor drive key 34 (FIGS. 1 and 2) to cause rotor discs 54, 55, 56, 57 to rotate substantially synchronously with wheel 10.

Stator discs 60, 61, 62 are configured to substantially remain rotationally stationary with respect to torque tube 50 as rotor discs 54, 55, 56, 57 rotate. Each of stator discs 60, 61, 62 may include a plurality of spline slots configured to engage a spline 63 of torque tube 50 to substantially maintain stator discs 60, 61, 62 rotationally stationary relative to rotor discs 54, 55, 56, 57. That is, stator discs 60, 61, 62 are configured to not rotate when rotor discs 54, 55, 56, 57 rotate. Each of stator discs 60, 61, 62 may include a plurality of spline slots on an inner perimeter of the respective stator discs 60, 61, 62. For example, stator disc 60 includes spline slot 90, stator disc 61 includes spline slot 92, and stator disc 62 includes spline slot 94. Spline slots 90, 92, 94 are configured to engage spline 63 to cause stator discs 60, 61, 62 to substantially remain rotationally stationary with respect to wheel 10 and rotor discs 54, 55, 56, 57.

Cooling system 70 is configured to receive a flow of cooling fluid (e.g., air) and direct the flow of cooling fluid into a wheel cavity of a wheel (e.g., wheel cavity 22 of wheel 10), which can be defined by inboard section 28 of wheel 10. For example, cooling system 70 may be configured to receive a flow of cooling fluid F and cause the flow of cooling fluid F to discharge within wheel cavity 22. In examples, cooling system 70 is configured to discharge the cooling fluid to cause a heat transfer from brake assembly 40 (e.g., disc stack 52) to the discharged cooling fluid, thereby facilitating cooling of brake assembly 40. Cooling system 70 may be configured to cause the discharged cooling fluid to exit wheel cavity 22 after the heat transfer to the cooling fluid, such that the cooling fluid substantially transfers heat from one or more components of brake assembly 40 to an ambient atmosphere surrounding wheel cavity 22 and wheel 10. In some examples, cooling system 70 is configured to establish a fluid connection with an exhaust section of a fan (e.g., fan exhaust section 74 (FIG. 3)), such that cooling system 70 substantially defines a forced convection cooling path from the fan exhaust to one or more portions of brake assembly 40 within wheel cavity 22.

Cooling system 70 is configured to receive the flow of cooling fluid F using a distributor 78 and deliver the flow F cooling fluid to one or more cooling channels defined by brake assembly 40, such as cooling channel 85. Cooling channel 85 is configured to receive a portion of the cooling fluid and discharge the portion of the cooling fluid into a wheel cavity of a wheel (e.g., wheel cavity 22 of wheel 10). Cooling channel 85 may be configured to discharge the portion of cooling fluid to cause a heat transfer from brake assembly 40 (e.g., disc stack 52) to the discharged cooling fluid. Cooling channel 85 may be one of a plurality of cooling channels defined by brake assembly 40 and configured to receive and distribute a portion of cooling fluid from distributor 78. In examples, brake assembly 40 is configured to define each of the cooling channels at a separate location on a perimeter substantially surrounding axis A, such that each cooling channel distributes a portion of the cooling fluid from a separate point on the perimeter. The cooling channels can be, for example, evenly distributed around axis A or unevenly distributed around axis A.

Distributor 78 is configured to receive the cooling fluid via one or more distributor inlets, such as distributor inlet 102. Distributor 78 is configured to direct at least some portion of the cooling flow from distributor inlet 102 to one or more distributor outlets, such as distributor outlet 104. In some examples, distributor 78 includes a header 106 configured to establish fluid communication from distributor inlet 102 to distributor outlet 104. Header 106 may be configured to confine the flow of cooling fluid F, such that substantially all (e.g., all or nearly all to the extent permitted by manufacturing) of the flow of cooling flow F entering distributor 78 via the one or more distributor inlets (e.g., distributor inlet 102) is caused to discharge through one or more of the distributor outlets (e.g., distributor outlet 104). In some examples, distributor 78 is configured to establish a fluid connection with an exhaust section of a fan (e.g., using a hose), such that distributor 78 defines a confined flow path from the exhaust section to the one or more distributor outlets.

In some examples, distributor 78 is configured such that a translation of axis A of wheel 10 and/or a portion of brake assembly 40 (e.g., torque tube 50) causes a translation of distributor 78. For example, distributor 78 may be configured such that, when wheel 10 and/or brake assembly 40 is caused to translate during the raising or lowering of the landing gear of an aircraft, distributor 78 remains substantially stationary with respect to axis A and/or the portion of brake assembly 40. In examples, distributor 78 is configured to substantially maintain a fluid connection between the one or more distributor inlets (e.g., distributor inlet 102) and the exhaust section of a fan (e.g., fan exhaust section 74 (FIG. 3)) when distributor 78 translates with wheel 10 and/or the portion of brake assembly 40.

In some examples, distributor 78 may be configured to conform to some portion of brake assembly 40, such that brake assembly 40 maintains distributor 78 substantially stationary with respect to torque tube 50. For example, distributor 78 may be configured to be positioned such that some portion of housing 71 resides between distributor inlet 102 and distributor outlet 104. Distributor 78 may be configured to reside between housing 71 and torque tube 50. In some examples, distributor 78 is a substantially separate component configured to attach to brake assembly 40. In other examples, brake assembly 40 defines part or all of distributor 78, such that distributor 78 is an integrated portion of brake assembly 40.

Distributor 78 may be configured such that header 106 extends at least partially or wholly around axis A. Distributor 78 may be configured to define each of the one or more distributor outlets at a separate location on a perimeter substantially surrounding axis A, such that distributor 78 distributes the flow of cooling fluid F at various points on the perimeter. For example, when cooling channel 85 is one of a plurality of cooling channels defined around axis A, distributor 78 may be configured such that each of the one or more distributor outlets provides cooling fluid to at least one of the cooling channels. In some cases, each distributor outlet provides cooling fluid to a respective cooling channel. In examples, each distributor outlet (e.g., distributor outlet 104) is configured to provide a fluid connection with at least one cooling channel (e.g., cooling channel 85).

Cooling channel 85 is configured to receive a portion of the cooling fluid from distributor 78 via one or more channel inlets, such as channel inlet 108, direct the flow of cooling fluid from channel inlet 108 to one or more channel outlets 109, such as channel outlets 110, 112, 114, 116, and discharge the portion of the cooling fluid into wheel cavity 22 via the one or more channel outlets 109. Cooling channel 85 is illustrated in cross-section with a cutting plane parallel to the page. Cooling channel 85 may define any number of cooling outlets, and may be configured to discharge the cooling fluid through any combination or all of the cooling outlets defined. In examples, cooling channel 85 defines a conduit extending substantially parallel to the axis A of wheel 10. In some examples, cooling channel 85 is configured such that channel outlets 110, 112, 114, 116 distribute the cooling fluid received via channel inlet 108 over a displacement substantially parallel to axis A of wheel 10. In addition, in some examples, cooling channel 85 is configured to distribute the cooling fluid received via channel inlet 108 over a displacement substantially parallel to axis A and in a direction radially outward from axis A.

Channel outlets 110, 112, 114, 116 are configured to discharge the portion of cooling fluid to cause a heat transfer from brake assembly 40 (e.g., disc stack 52) to the discharged cooling fluid. Channel outlets 110, 112, 114, 116 may be configured to discharge the portion of cooling fluid such that the cooling fluid contacts a surface of brake assembly 40. For example, channel outlets 110, 112, 114, 116 may be configured to cause the cooling fluid to establish an impingement flow, a cross-flow, or some other flow geometry relative to the surface of brake assembly 40. In examples, channel outlets 110, 112, 114, 116 are configured to substantially direct a discharge of cooling fluid toward disc stack 52 to facilitate cooling of one or more of rotor disc 54, 55, 56, 57 and/or stator disc 60, 61, 62. In examples, channel outlets 110, 112, 114, 116 are configured to direct the discharge of cooling fluid to cause the cooling fluid to flow in a direction radially outward from axis A of the wheel 10. Cooling channel 85 may define one or more channel outlets configured to discharge cooling fluid in any suitable direction, including radially outward and/or inward from axis A, substantially parallel to axis A, substantially perpendicular to axis A, or some other direction relative to axis A.

Cooling channel 85 may be defined by any suitable structure. In examples, cooling channel 85 is defined by spline 63, such that cooling channel 85 is a cavity defined by spline 63. In these examples, spline 63 may define channel inlet 108 to receive the cooling flow and defines channel outlets 110, 112, 114, 116 configured to direct the portion of the cooling flow into wheel cavity 22. Spline 63 may be integrally formed with and defined by an outer surface of torque tube 50, or may be separate from and mechanically affixed to torque tube 50. In some examples, cooling channel 85 is defined by a cavity extending through spline 63 and/or torque tube 50. In addition or instead, in some examples, cooling channel 85 is defined between a portion of spline 63 and torque tube 50. In some examples, spline 63 is mechanically affixed to torque tube 50 and cooling channel 85 is defined by a cavity through spline 63 and/or torque tube 50.

Figure 5:
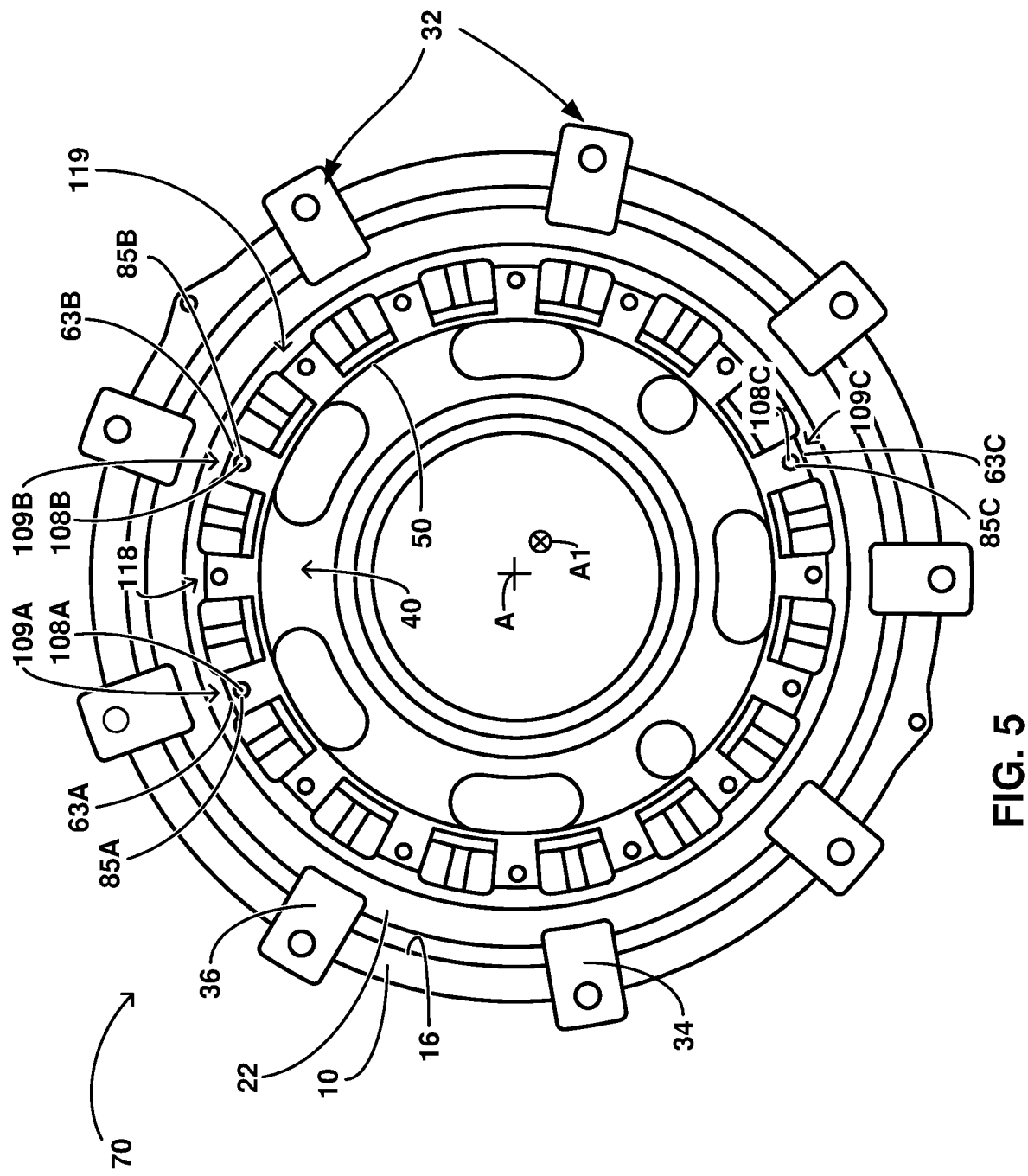
FIG. 5 is a plan view illustrating an example of a plurality of cooling channels defined by a brake assembly.

An example of this configuration is shown in in FIG. 5, which illustrates a cooling system 70 including a portion of wheel 10 and brake assembly 40. FIG. 5 schematically illustrates interior surface 16, wheel cavity 22, and the plurality of rotor drive keys 32 of wheel 10, including rotor drive key 34 and rotor drive key 36. FIG. 5 illustrates torque tube 50 and a plurality of splines 118 of brake assembly 40, including spline 63A, spline 63B, and spline 63C. Axis A of wheel 10 is illustrated perpendicular to the page, and axial direction A1 proceeds into the page. The plurality of rotor drive keys 32 and the plurality of splines 118 are configured to engage a disc stack (e.g., disc stack 52 (FIGS. 2, 4, 5) positioned between interior surface 16 and torque tube 50. In FIG. 5, wheel 10 and brake assembly 40 are illustrated as cross-sections with a cutting plane taken parallel to the page (e.g., perpendicular to axis A).

Cooling system 70 includes a plurality of cooling channels 119. For example, spline 63A defines a cooling channel 85A including channel inlet 108A. In the example shown in FIG. 5, cooling channel 85A is a cavity defined with spline 63A and extends substantially parallel to wheel axis A. Cooling channel 85A defines one or more channel outlets 109A configured to discharge cooling fluid into wheel cavity 22. Cooling channel 85A defines a confined flow path between channel inlet 108A and the one or more channel outlets 109A, such that substantially all cooling fluid entering channel inlet 108A is caused to discharge through the one or more channel outlets 109A. The one or more channel outlets 109A may be configured to discharge the cooling fluid into wheel cavity 22 over a displacement substantially parallel to axis A. The one or more channel outlets 109A may be configured to discharge the cooling fluid in a radially outward direction of wheel 10 (e.g., a direction from axis A toward interior surface 16). In examples, the one or more channel outlets 109A may be configured to discharge cooling fluid in any suitable direction, including radially outward and/or inward from axis A, substantially parallel to axis A, substantially perpendicular to axis A, or some other direction relative to axis A.

Brake assembly 40 may be configured to define a plurality of cooling channels 119 around a perimeter substantially surrounding axis A. For example, spline 63B defines cooling channel 85B, channel inlet 108B, and one or more channel outlets 109B. Spline 63C defines cooling channel 85C, channel inlet 108C, and one or more channel outlets 109C. Any individual spline within the plurality of splines 118 may define a cooling channel, channel inlet, and one or more channel outlets, with the cooling channel configured similarly to cooling channel 85A, channel inlet 108A, and the one or more cooling channel outlets 109A. Hence, each cooling channel defined by plurality of splines 118 may be configured to distribute a cooling fluid into wheel cavity 22 from a separate point on the perimeter around axis A. Each cooling channel may be configured to cause the cooling fluid to contact disc stack 52 (FIGS. 2, 4, and 5) within cavity 22, such that cooling system 70 distributes the cooling fluid over the perimeter around axis A and over a plurality of displacements substantially parallel to axis A. Each channel inlet may be configured to establish a fluid connection with a distributor outlet 104 of a distributor 78 (FIGS. 4, 5), such that cooling system 70 distributes a cooling fluid received by distributor 78 (e.g., from fan exhaust section 74 (FIG. 3)) within cavity 22 over the perimeter around axis A and/or over the plurality of displacements along axis A.

Figure 6:
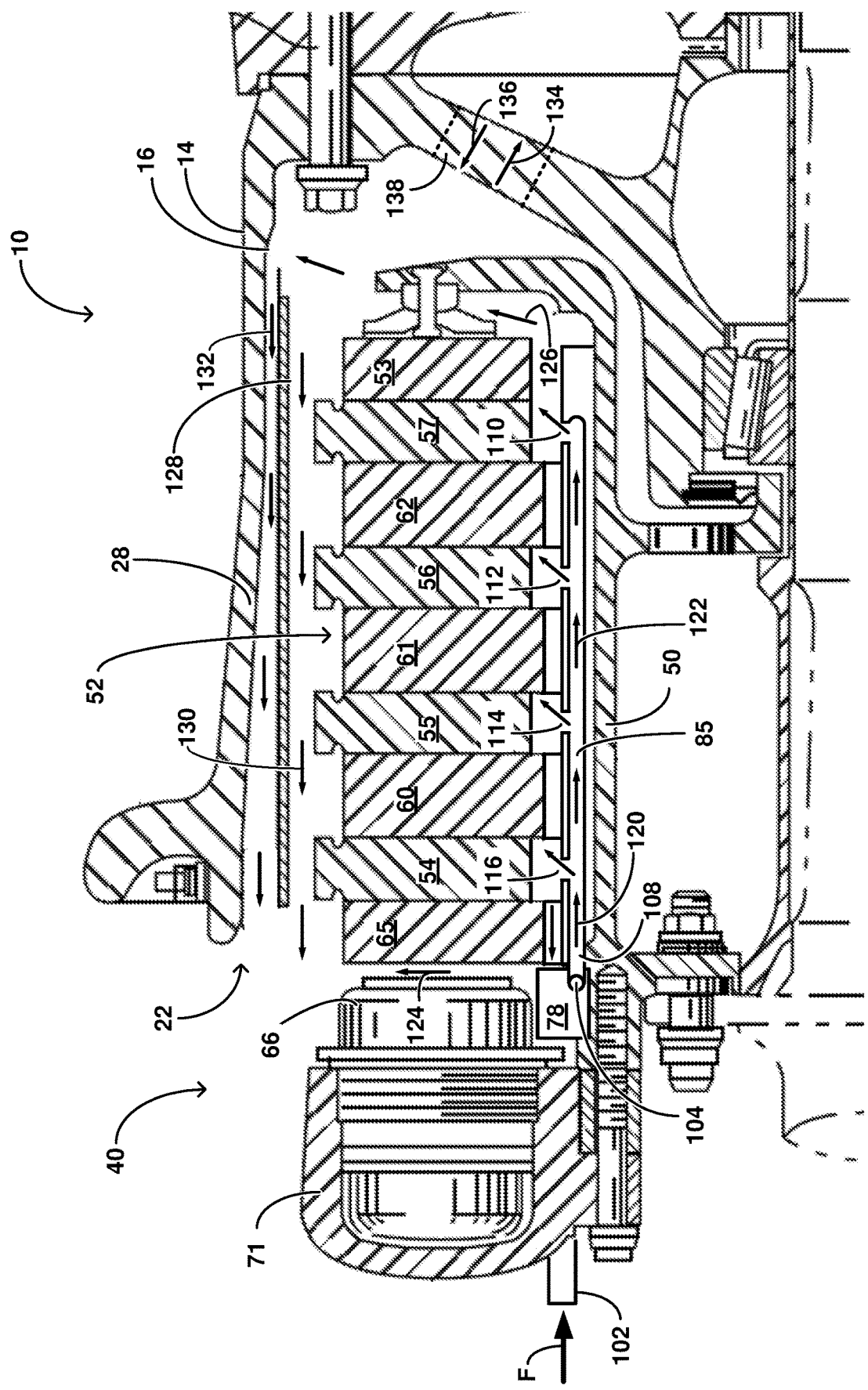
FIG. 6 is a plan view illustrating example flow paths of a cooling system.

As an example, FIG. 6 illustrates a cooling flow within wheel cavity 22 of wheel 10 generated by a cooling system 70. Cooling system 70 is configured to generate a flow within cooling channel 85 having a flow direction generally indicated by the solid-head arrows of FIG. 6 (e.g., arrow 120) when a pressurized flow of cooling fluid F (e.g., from fan exhaust section 74 (FIG. 3)) is introduced to distributor inlet 102. Cooling channel 85 is configured to receive the cooling fluid (e.g., a portion of the flow of cooling fluid F) via cooling channel inlet 108 from distributor outlet 104.

The flow of cooling fluid entering cooling channel 85 may substantially pressurize cooling channel 85 relative to wheel cavity 22, such that the cooling fluid discharges through one or more of channel outlet 110, channel outlet 112, channel outlet 114, and/or channel outlet 116. This illustrated in FIG. 7 by the solid-head arrows indicating a flow path through channel outlets 110, 112, 114, 116 from cooling channel 85 to wheel cavity 22. The cooling fluid discharged may flow through wheel cavity 22 through a number of flow paths defined by brake assembly 40 and/or wheel 10. In examples, one or more of channels outlets 110, 112, 114, 116 are configured to direct the cooling fluid toward disc stack 52, to cause the cooling fluid to establish an impingement flow, a cross-flow, or some other flow geometry with one or more components of disc stack 52 (e.g., one or more of rotor discs 54, 55, 56, 57 and/or stator discs 60, 61, 62).

Cooling system 70 may be configured to cause the cooling fluid to flow from cooling channel 85, through wheel cavity 22, and to an environment surrounding wheel 10, such that the flow of the cooling fluid causes a forced convection heat transfer from one or more components within wheel cavity 22 to the surrounding environment. Cooling system 70 is configured to cause the cooling fluid to flow through a flow path defined by brake assembly 40, wheel 10, and/or other structures within wheel cavity 22. Cooling system 70 may cause the cooling fluid to flow through a plurality of flow paths substantially simultaneously. For example, cooling system 70 may cause the cooling fluid to flow through a space bounded by torque tube 50 and disc stack 52 (e.g., arrow 122), bounded by piston 68 and pressure plate 65 (e.g., arrow 124), and/or bounded by torque tube 50 and backing plate 53 (e.g., arrow 126). In addition to or instead of the flow path between torque tube 50 and disc stack 52, cooling system 70 may cause the cooling fluid to flow through a space bounded by disc stack 52 and a heat shield 128 surrounding wheel cavity 22 (e.g., arrow 130), and/or bounded by heat shield 128 and interior surface 16 of wheel 10 (e.g., arrow 132). Cooling system 70 may also cause the cooling fluid to flow through wheel cavity 22 from inboard section 28 to outboard section 30 (e.g., arrow 134) or from outboard section 30 to inboard section 28 (e.g., arrow 136) via one more open passages between inboard section 28 and outboard section 30, such as passage 138 (shown in hidden lines).

In some examples (e.g., when disc stack 52 is not compressed by piston 68), cooling system 70 may cause the cooling fluid to flow between adjacent discs in disc stack 52. For example, cooling system 70 may cause the cooling fluid to flow between stator disc 60 and rotor disc 54 and/or rotor disc 55, between stator disc 61 and rotor disc 55 and/or rotor disc 56, and/or between stator disc 62 and rotor disc 56 and/or rotor disc 57. Hence, cooling system 70 may be configured to cause some portion of the cooling fluid F to flow from one or more of channel outlets 110, 112, 1114, 116 to an environment outside of wheel 10 using any flow path defined within wheel cavity 22, in order to cause a forced convection heat transfer from one or more components and/or structures within wheel cavity 22 (e.g., brake assembly 40) to the environment surrounding wheel 10.

Figure 7:
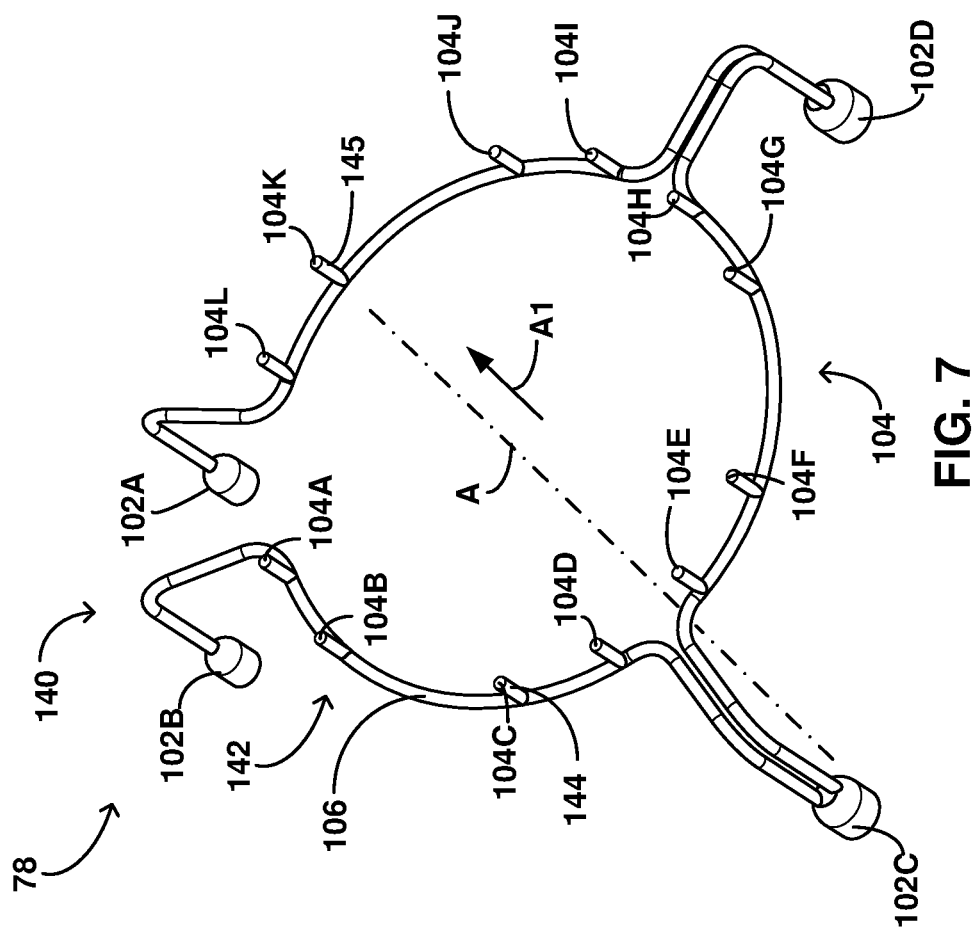
FIG. 7 is a perspective view of an example distributor.

FIG. 7 illustrates an example distributor 78 configured to deliver a cooling fluid from a fluid source to one or more cooling channels within cooling system 70. Distributor 78 includes one or more distributor inlets 140 including distributor inlets 102A-102D. Distributor 78 further includes one or more distributor outlets 142 including distributor outlets 104A-104L. Header 106 is configured to define a confined flow path from distributor inlets 102A-102D to distributor outlets 104A-104L, such that some portion (or all) of a flow of cooling fluid entering distributor inlets 102A-102D is caused to discharge through one of distributor outlets 104A-104L. Each distributor inlet 102A-102D may be configured to provide a fluid connection with an exhaust section of a fan. Each distributor outlet 104A-104L may be configured to provide a fluid connection with at least one cooling channel (e.g., cooling channel 85A, cooling channel 85B, cooling channel 85C (FIG. 5))). Thus, distributor 78 may be configured to define a confined flow path for a flow of cooling fluid from a fan exhaust section of a fan (e.g., fan exhaust section 74 (FIG. 3)) to a plurality of cooling channels defined by cooling system 70 (e.g., defined by brake assembly 40).

In examples, distributor 78 includes one or more fluid channels configured to establish fluid communication between distributor outlets 104A-104L and header 106. For example, distributor 78 may include fluid channel 144 configured to establish fluid communication between header 106 and distributor outlet 104C. Distributor 78 may include fluid channel 145 between header 106 and distributor outlet 104K. In some example, distributor 78 includes a fluid channel establishing fluid communication between header 106 and one or more of distributor outlets 104A-104L.

Distributor 78 may conform to a portion of brake assembly 40 (e.g., housing 71). Distributor 78 may engage housing 71 and/or another portion of brake assembly 40 such that a translation of axis A of wheel 10 (e.g., during a raising or lowering of the landing gear of an aircraft) causes a translation of distributor 78. Distributor 78 may engage housing 71 and/or another portion of brake assembly 40 such that distributor 78 is substantially stationary relative to axis A of wheel 10. In some examples, distributor 78 is configured to conform to the portion of brake assembly 40 (e.g., housing 71) to cause a flow of cooling fluid received via one or more of distributor inlets 102A-102D to transit in an outboard direction of wheel 10 (e.g., in the axial direction A1) before discharging through one or more of distributor outlets 104A-104L. Distributor 78 may be configured such that distributor inlets 102A-102D extend in the inboard direction of wheel 10 (e.g., a direction opposite the axial direction A1) when housing 71 is supported by brake assembly 40. In examples, distributor 78 is configured such that distributor outlets 104A-104L extend in the outboard direction of wheel 10 (e.g., in the axial direction A1) when housing 71 is supported by brake assembly 40.

Cooling system 70 described herein, as well as wheel 10 and brake assembly 40, and the components thereof, may be made from any suitable material. For example, the material may be any material of suitable strength for the intended use of cooling system 70, wheel 10, brake assembly 40, and the components thereof. In some examples, the material includes a metal or a metal alloy. For example, the material may include a nickel alloy or steel alloy. As one example, the material may include stainless steel.

Coolant system 70, wheel 10, brake assembly 40, and the components thereof can be formed using any suitable technique. Cooling system 70, wheel 10, brake assembly 40, and the components thereof may be forged, casted, made from bar stock, additive manufactured (e.g., three-dimensionally (3D) printed), extruded, drawn, or be produced using other suitable methods. In some examples, cooling system 70, wheel 10, brake assembly 40, and the components thereof may be machined to define the configurations described herein. In other examples, coolant system 70, wheel 10, brake assembly 40, and the components thereof may be formed without having to be substantially machined.

Cooling system 70, wheel 10, brake assembly 40, and the components thereof, may be formed to have any shape. In some examples, two or more components of cooling system 70, wheel 10, and brake assembly 40 are formed to be physically separate from each other and subsequently joined and/or attached to define cooling system 70, wheel 10, and brake assembly 40. In other examples, two or more components of cooling system 70, wheel 10, and brake assembly 40 have a unitary body construction, e.g., are formed to be one piece. In some examples, the one or more distributor outlets 142, header 106, and the one or more distributor outlets 142 are formed to be physically separate from each other and subsequently joined and/or attached to define distributor 78. In other examples, the one or more distributor outlets 142, header 106, and the one or more distributor outlets 142 have a unitary body construction, e.g., are formed to be one piece.

Cooling channels described herein, such as cooling channels 85, 85A, 85B, 85C, may be formed within cooling system 70, brake assembly 40, and/or wheel 10 using any using any suitable technique. In examples, a first component and/or second component of are configured to join and/or attach to define cooling channels 85, 85A, 85B, 85C. In examples, a first component and/or second component of cooling system 70, brake assembly 40, and/or wheel 10 are configured to join and/or attach to define cooling channels 85, 85A, 85B, 85C. In examples, cooling channels 85, 85A, 85B, 85C may be formed within cooling system 70, wheel 10, brake assembly 40, and the components thereof through forging, casting, machining, additive manufacturing, extrusion, drawing, or other suitable methods.

In some examples, wheel 10 may be finish machined from a near-net-shaped aluminum forging and contain an axial assembly and/or wheel rim for assembly of brake assembly 40 and/or cooling system 70 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including rotor discs 54, 55, 56, 57 and stator discs 60. 62, 62, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multi-layer structure.

Control circuitry 79, as well as other control circuitry described herein, can comprise any suitable arrangement of hardware, software, firmware, or any combination thereof, to perform the techniques attributed to control circuitry 79 herein. For example, control circuitry 79 may include any one or more microprocessors, digital signal processors (DSPs), application specific integrated circuits (ASICs), field programmable gate arrays (FPGAs), or any other equivalent integrated or discrete logic circuitry, as well as any combinations of such components. Control circuitry 79 may be within a controller housing configured to be located adjacent to cooling system 70, brake assembly 40, and/or wheel 10, or configured to remain substantially separate from cooling system 70, brake assembly 40, and/or wheel 10.

Communication link 80 and/or communication link 83 ("communication links 80, 83") (FIG. 3) as well as other communication links described herein, may be hard-line and/or wireless communications links. In some examples, communication links 80, 83 may comprise some portion of control circuitry 79. Communication links 80, 83 may comprise a wired connection, a wireless Internet connection, a direct wireless connection such as wireless LAN, Bluetooth™, Wi-Fi™, and/or an infrared connection. Communication links 80, 83 may utilize any wireless or remote communication protocol.

User interface 81 may have any suitable configuration. For example, user interface 81 can include a switch, a button, another input mechanism, a speaker configured to receive voice commands from a user, a display, such as a liquid crystal (LCD), light-emitting diode (LED), or organic light-emitting diode (OLED). In some examples, user interface 81 may include a touch screen. User interface 81 is configured to receive user input, e.g., in the form of manipulating a switch and/or pressing one or more buttons on a keypad or via a touch screen, which may be a user input controlling the operation of cooling system 70 (e.g., fan 72). In some examples, user interface 81 is also configured to display information, such as one or more indications providing information on the actuation and/or status of cooling system 70.

Figure 8:
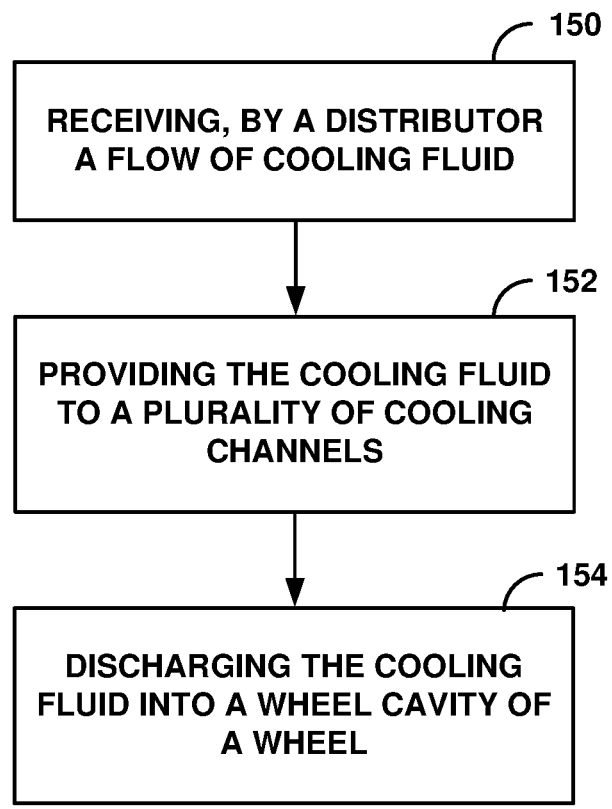
FIG. 8 is a flow diagram illustrating an example method of cooling a brake assembly.

FIG. 8 illustrates a flow diagram of an example technique for cooling a brake assembly. Although the technique is mainly described with reference to cooling system 70 and the components thereof (FIGS. 3-10), the technique may be used with other cooling systems in other examples. In addition, control circuitry 79 alone or in combination with control circuitry of other devices can perform any part of the technique shown in FIG. 8.

The technique includes receiving a flow of cooling fluid in a distributor 78 (150). Distributor 78 may receive the flow of cooling fluid in one or more distributor inlets 102, 102A-102D. Distributor 78 may direct the flow of cooling fluid to one or more distributor outlets 104, 104A-104L. In some examples, distributor 78 directs the flow of cooling fluid using header 106. Header 106 may define a confined flow path between distributor inlets 102, 102A-102D and distributor outlets 104, 104A-104L, such that substantially all cooling fluid (e.g., all or nearly all with the exception of cooling fluid incidentally lost) entering via distributor inlets 102, 102A-102D is caused to discharge from distributor outlets 104, 104A-104L. Distributor 78 may remain substantially stationary with respect to axis A of wheel 10 and/or some portion of brake assembly 40 (e.g., housing 71), such that distributor 78 translates when the axis A of wheel 10 and/or the portion of brake assembly 40 translates.

The flow of cooling fluid can be generated using any suitable fluid source, such as a fan 72. Fan 72 may cause the cooling fluid to flow in a direction from fan inlet section 73 to fan exhaust section 74. Fan exhaust section 74 may direct the flow of cooling fluid into distributor inlets 102, 102A-102D. In examples, fan exhaust section 74 directs the flow of cooling fluid using one or more conduits such as conduit 75. The one or more conduits may define a confined flow path between fan exhaust section 74 and distributor inlets 102, 102A-102D, such that substantially all cooling fluid caused to flow by fan 72 is caused to enter distributor inlets 102, 102A-102D. Fan 72 may remain substantially stationary with respect to a portion of vehicle (e.g., a landing gear strut of an aircraft) as axis A of wheel 10 and/or some portion of brake assembly 40 (e.g., housing 71) translates relative to the portion of the vehicle.

The technique includes providing the cooling fluid using distributor 78 to one of more of a plurality of cooling channels 119, such as cooling channels 85, 85A, 85B, 85C (152). The plurality of cooling channels 113 may receive the cooling fluid using one or more channel inlets such as channel inlets 108, 108A, 108B, 108c. Distributor 78 may provide the cooling fluid to the channel inlets 108, 108A, 108B, 108C using distributor outlets 104, 104A-104L. In examples, one or more of distributor outlets 104, 104A-104L establish a fluid connection with at least one of the channel inlets such as channel inlet 108, 108A, 108B, and/or 108C, such that distributor 78 defines a confined flow path from the one or more distributor outlets 104, 104A-104L to the at least one channel inlet. In examples, distributor inlets 102, 102A-102D establish a fluid connection with fan exhaust section 74 and each of distributor outlets distributor outlets 104, 104A-104L establish a fluid connection with at least one of at least one of the channel inlets, such that such that distributor 78 defines a confined flow path from fan exhaust section 74 to the at least one channel inlet.

Distributor 78 provides the cooling fluid to a plurality of cooling channels 119, which can be arranged around a perimeter surrounding axis A of wheel 10 in some examples. Distributor 78 may provide the cooling fluid to a plurality of cooling channels 119 extending in a direction substantially parallel to axis A. In some examples, distributor 78 provides the cooling fluid to a plurality of cooling channels 119 defined by brake assembly 40 within wheel cavity 22 of wheel 10. For example, a plurality of splines 118 connected and/or attached to torque tube 50 of brake assembly 40 defines the plurality of cooling channels 119. The plurality of splines 118 may define channel inlets 108, 108A, 108B, 108C. A spline (e.g., spline 63) in the plurality of splines 118 may be integrally formed with and defined by an outer surface of torque tube 50, or may be separate from and mechanically affixed to torque tube 50. In examples, a cavity extending through spline 63 defines cooling channel 85, 85A, 85B, 85C. In examples, a portion of spline 63 and torque tube 50 defines cooling channel 85, 85A, 85B, 85C.

The technique includes discharging the cooling fluid into wheel cavity 22 of wheel 10 (154). The plurality of cooling channels 119 may cause the cooling fluid to discharge into wheel cavity 22 using one or more channel outlets 110, 112, 114, 116. Channel outlets 110, 112, 114, 116 may discharge the cooling fluid to cause a heat transfer from brake assembly 40 to the discharged cooling fluid. Channel outlets 110, 112, 114, 116 may discharge the portion of cooling fluid such that the cooling fluid contacts a surface of brake assembly 40. In examples, channel outlets 110, 112, 114, 116 direct a discharge of cooling fluid toward disc stack 52 to facilitate cooling of one or more of rotor disc 54, 55, 56, 57 and/or stator disc 60, 61, 62. In examples, channel outlets 110, 112, 114, 116 cause the cooling fluid to flow in a direction radially outward from axis A of the wheel 10. In examples, channel outlets 110, 112, 114, 116 cause the cooling fluid to flow in a direction radially inward toward axis A, substantially parallel to axis A, substantially perpendicular to axis A, or some other direction relative to axis A.

The technique may include controlling an operation of fan 72 using control circuitry 79. Control circuitry 79 may receive an activation signal (e.g., via communication link 80) and cause fan 72 to generate the flow of cooling fluid. Control circuitry 79 may receive a deactivation signal (e.g., via communication link 80) and cause fan 72 to cease generating the flow of cooling fluid. In examples, a user interface 81 is engaged by an operator to initiate the activation and/or deactivation signal (e.g., via communication link 83). In examples, an operator within a cockpit of an aircraft initiates the activation and/or deactivation signal.

In examples, the technique includes maintaining a fluid connection between fan exhaust section 74 and conduit 75 wheel 10 and axis A translate relative to fan 72 and/or a portion of a vehicle (e.g., during the raising or lowering of the landing gear of an aircraft). In examples, the technique includes maintaining a fluid connection between conduit 75 and distributor inlets 102, 102A-102D when wheel 10 and axis A translate relative to fan 72 and/or the portion of the vehicle. In examples, the technique includes maintaining a fluid connection between distributor outlets 104, 104A-104L when wheel 10 and axis A translate relative to fan 72 and/or the portion of the vehicle. The technique may include maintaining a confined flow path from fan exhaust section 74 to the plurality of cooling channels 119 when wheel 10 and axis A translate relative to fan 72 (e.g., during the raising or lowering of the landing gear of an aircraft).

The techniques described in this disclosure, including those attributed to control circuitry 79 (FIG. 3) and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A system comprising: a brake assembly configured to be positioned within a wheel cavity of a wheel, wherein the brake assembly defines a plurality of cooling channels; and a distributor configured to receive a flow of cooling fluid and supply the cooling fluid to the plurality of cooling channels, wherein at least one cooling channel of the plurality of cooling channels is configured to receive a portion of the cooling fluid from the distributor and discharge the portion of the cooling fluid into the wheel cavity when the brake assembly is positioned within the wheel cavity.

Example 2: The system of example 1, wherein the distributor includes one or more distributor inlets and a plurality of distributor outlets, wherein the distributor is configured to receive the cooling fluid in the one or more distributor inlets and issue a portion of the cooling fluid to each distributor outlet, wherein each distributor outlet is configured to establish a fluid connection to one or more of the cooling channels.

Example 3: The system of example 1 or 2, further comprising a fan configured to supply the flow of cooling fluid to the distributor.

Example 4: The system of example 3, wherein the fan includes a fan housing defining a fan exhaust, and wherein the distributor is configured to establish a fluid connection with the fan exhaust.

Example 5: The system of example 3 or 4, wherein the fan includes a turbofan including a plurality of compression stages.

Example 6: The system of any of examples 3-5, wherein the fan is configured to attach to a strut configured to support the wheel.

Example 7: The system of any of examples 1-6, wherein the brake assembly includes: a torque tube; and a plurality of splines attached to the torque tube, wherein the plurality of splines define the plurality of cooling channels.

Example 8: The system of example 7, wherein each cooling channel is defined by a cavity within a spline of the plurality of splines, and wherein the distributor is configured to inject the portion of the cooling fluid into the cavity.

Example 9: The system of any of examples 1-8, wherein the at least one channel includes a plurality of channel outlets configured to distribute the portion of the cooling fluid over a displacement substantially parallel to an axis of the wheel.

Example 10: The system of any of examples 19, wherein the brake assembly comprises a disc stack, and wherein the at least one cooling channel is configured to discharge the portion of the cooling fluid toward the disc stack.

Example 11: The system of any of examples 1-10, wherein the distributor includes a header configured to receive the flow of cooling fluid, wherein the distributor defines a plurality of parallel fluid channels in fluid communication with the header, wherein each parallel channel defines a distributor outlet.

Example 12: The system of example 11, wherein the header is configured to surround an axis of the wheel.

Example 13: The system of example 11 or 12, wherein the distributor is configured to engage a portion of the brake assembly such that a translation of the portion of the brake assembly parallel to an axis of the wheel causes a translation of the header parallel to the axis of the wheel.

Example 14: The system of any of examples 1-13, wherein the plurality of cooling channels are distributed around an axis of the wheel.

Example 15: A system comprising: a brake assembly configured to be positioned within a wheel cavity of a wheel, wherein the brake assembly defines a plurality of cooling channels; a fan configured to provide a flow of cooling fluid; and a distributor including one or more distributor inlets and a plurality of distributor outlets, wherein the distributor is configured to receive the flow of cooling fluid from the fan through the one or more distributor inlets and supply the flow of cooling fluid to the plurality of cooling channels through the plurality of distributor outlets, wherein each cooling channel is configured to establish a fluid connection with at least one of the distributor outlets, and wherein at least one cooling channel is configured to discharge a portion of the cooling fluid into the wheel cavity.

Example 16: The system of example 15, wherein the fan includes a fan housing defining a fan exhaust, and wherein the distributor is configured to establish a fluid connection with the fan exhaust.

Example 17: The system of example 15 or 16, wherein the brake assembly includes: a torque tube; and a plurality of splines attached to the torque tube, wherein the plurality of splines define the plurality of cooling channels.

Example 18: The system of example 17, wherein the brake assembly comprises a disc stack, and wherein the at least one cooling channel is configured to discharge the portion of the cooling fluid toward the disc stack.

Example 19: A method comprising: receiving, by a distributor, a flow of cooling fluid; providing, by the distributor, the flow of cooling fluid to a plurality of cooling channels, wherein the plurality of cooling channels are defined by a brake assembly in a wheel cavity of a wheel; and discharging, by the plurality of cooling channels, a portion of the cooling fluid into the wheel cavity.

Example 20: The method of claim 19, further comprising providing the supply of cooling fluid to the distributor using a fan.

Various examples have been described. These and other examples are within the scope of the following claims.

What is claimed is:

1. A system comprising:
a brake assembly configured to be positioned within a wheel cavity of a wheel, wherein the brake assembly includes a torque tube and at least one spline positioned on the torque tube,
wherein the at least one spline, or the at least one spline and the torque tube, define a cavity extending within the at least one spline, the cavity defining a cooling channel configured to provide a cooling fluid to the wheel cavity, and
wherein the cooling channel defines a channel inlet and a plurality of channel outlets; and
a distributor configured to receive a cooling fluid and supply the cooling fluid to the channel inlet,
wherein the cooling channel is configured to distribute the cooling fluid over a displacement substantially parallel to an axis of the wheel using the plurality of channel outlets when the distributor supplies the cooling fluid to the channel inlet and the brake assembly is positioned within the wheel cavity.

2. The system of claim 1, wherein the brake assembly defines a plurality of cooling channels, wherein the distributor includes one or more distributor inlets and a plurality of distributor outlets, wherein the distributor is configured to receive the cooling fluid in the one or more distributor inlets and issue a portion of the cooling fluid to each distributor outlet of the plurality of distributor outlets, and wherein each distributor outlet is configured to establish a fluid connection to one or more of the cooling channels of the plurality of cooling channels.

3. The system of claim 1, further comprising a fan configured to supply the cooling fluid to the distributor.

4. The system of claim 3, wherein the fan includes a fan housing defining a fan exhaust, and wherein the distributor is configured to establish a fluid connection with the fan exhaust.

5. The system of claim 3, wherein the fan includes a turbofan including a plurality of compression stages.

6. The system of claim 3, wherein the fan is configured to attach to a strut configured to support the wheel.

7. The system of claim 1, wherein the distributor is configured to inject the cooling fluid into the cavity when the distributor provides the cooling fluid to the channel inlet.

8. The system of claim 1, wherein the brake assembly comprises a disc stack, and wherein the cooling channel is configured to discharge the cooling fluid toward the disc stack.

9. The system of claim 1, wherein the distributor includes a header configured to receive the cooling fluid, wherein the distributor defines a plurality of parallel fluid channels in fluid communication with the header, wherein each parallel fluid channel defines a distributor outlet.

10. The system of claim 9, wherein the header is configured to surround an axis of the wheel.

11. The system of claim 9, wherein the distributor is configured to engage a portion of the brake assembly such that a translation of the portion of the brake assembly parallel to the axis of the wheel causes a translation of the header parallel to the axis of the wheel.

12. The system of claim 2, wherein the plurality of cooling channels are distributed around the axis of the wheel when the brake assembly is positioned within the wheel cavity.

13. A system comprising:
a brake assembly configured to be positioned within a wheel cavity of a wheel,
wherein the brake assembly includes a torque tube and a spline positioned on the torque tube,
wherein the spline, or the spline and the torque tube, define a cavity extending within the spline, the cavity defining a cooling channel, and
wherein the cooling channel defines a channel inlet and a plurality of channel outlets;
a fan configured to provide a flow of cooling fluid; and
a distributor including a distributor inlet and a distributor outlet,
wherein the distributor is configured to receive the flow of cooling fluid from the fan through the distributor inlet and supply the flow of cooling fluid to the cooling channel through the distributor outlet, and
wherein the cooling channel is configured to distribute the cooling fluid over a displacement substantially parallel to an axis of the wheel using the plurality of channel outlets when the distributor provides the cooling fluid to the channel inlet and the brake assembly is positioned within the wheel cavity.

14. The system of claim 13, wherein the fan includes a fan housing defining a fan exhaust, and wherein the distributor is configured to establish a fluid connection with the fan exhaust.

15. The system of claim 13, wherein the brake assembly comprises a disc stack, and wherein the cooling channel is configured to discharge the portion of the cooling fluid toward the disc stack.

16. A method comprising:
receiving, by a distributor, a flow of cooling fluid;
providing, by the distributor, the flow of cooling fluid to a channel inlet of a cooling channel of a brake assembly including a torque tube and a spline positioned on the torque tube, wherein a cavity defined by the spline, or defined by the spline and the torque tube, defines the cooling channel, wherein the cavity extends within the spline, and wherein the cooling channel defines a plurality of channel outlets; and discharging, by the cooling channel using the plurality of cooling channel outlets, the flow of cooling fluid over a displacement substantially parallel to an axis of a wheel when the brake assembly is positioned within a wheel cavity of the wheel.

17. The method of claim 16, further comprising providing the flow of the cooling fluid to the distributor using a fan.

18. The system of claim 13, wherein:

the brake assembly defines a plurality of cooling channels, the distributor inlet is one of one or more distributor inlets of the distributor and the distributor outlet is one of a plurality of distributor outlets of the distributor, the distributor is configured to receive the flow of cooling fluid from the fan through the one or more distributor inlets and supply the flow of cooling fluid to the plurality of cooling channels through the plurality of distributor outlets, each cooling channel of the plurality of cooling channels is configured to establish a fluid connection with at least one of the distributor outlets, and at least one cooling channel of the plurality of cooling channels is configured to discharge a portion of the cooling fluid into the wheel cavity when the brake assembly is positioned within the wheel cavity.

19. The system of claim 1, wherein the at least one spline defines the plurality of channel outlets.

20. The system of claim 19, wherein the at least one spline defines the channel inlet.

* * * * *